(12) United States Patent
Jung et al.

(10) Patent No.: US 10,308,264 B2
(45) Date of Patent: Jun. 4, 2019

(54) SYSTEM FOR CONTROLLING SPEED OF RAILWAY VEHICLES BY CONSIDERING BRAKING CHARACTERISTIC

(71) Applicant: LSIS CO., LTD., Anyang-si, Gyeonggi-do (KR)

(72) Inventors: Jong-Chul Jung, Anyang-si (KR); Yong-Gee Cho, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 250 days.

(21) Appl. No.: 15/366,314

(22) Filed: Dec. 1, 2016

(65) Prior Publication Data
US 2017/0190340 A1 Jul. 6, 2017

(30) Foreign Application Priority Data
Dec. 31, 2015 (KR) .................. 10-2015-0191437

(51) Int. Cl.
*B61L 3/00* (2006.01)
*B61L 27/04* (2006.01)
*B61L 27/00* (2006.01)

(52) U.S. Cl.
CPC ............ *B61L 3/006* (2013.01); *B61L 3/008* (2013.01); *B61L 27/04* (2013.01); *B61L 2027/005* (2013.01); *Y02T 10/7258* (2013.01)

(58) Field of Classification Search
None
See application file for complete search history.

(56) References Cited

U.S. PATENT DOCUMENTS

| | | | |
|---|---|---|---|
| 6,760,712 B1* | 7/2004 | Bonissone | B61L 27/0055 701/19 |
| 2010/0332058 A1* | 12/2010 | Kane | B61L 3/008 701/20 |
| 2013/0096741 A1* | 4/2013 | Jung | B61L 3/006 701/20 |
| 2015/0197247 A1* | 7/2015 | Ichinokawa | B60W 30/143 701/93 |

(Continued)

FOREIGN PATENT DOCUMENTS

| | | |
|---|---|---|
| JP | 3657446 B2 | 3/2005 |
| JP | 2014133473 A | 7/2014 |
| KR | 10-1256315 B1 | 4/2013 |

OTHER PUBLICATIONS

Sandidzadeh, Reliability and Safety in Railway, Mar. 2012, chapter 5 "Improvement of Automatic Train Operation", pp. 121-140 (Year : 2012).*

(Continued)

*Primary Examiner* — David P. Merlino
(74) *Attorney, Agent, or Firm* — K&L Gates LLP

(57) ABSTRACT

The present disclosure relates to a speed control system of a railway vehicle in consideration of a braking characteristic, and more particularly, to a speed control system of a railway vehicle in consideration of a braking characteristic, which calculates in real time a time-to-target-speed-crossing (TTTSC) that is a time required for a speed of a train to exceed a speed of an automatic train operation (ATO) profile through a future speed estimation of the train, and controls the speed of the train to be interlocked with the TTTSC.

5 Claims, 4 Drawing Sheets

(56) References Cited

U.S. PATENT DOCUMENTS

2015/0291193 A1* 10/2015 Perras .................. B61L 25/025
                                                              246/122 R
2016/0297456 A1* 10/2016 Nameki ................. B61L 3/006

OTHER PUBLICATIONS

Hairong, Fuzzy Tuning of ATO System in Train Speed Control with Multiple Working Conditions, Jul. 2010, Proceedings of the 29th Chinese Control Conference, https://ieeexplore.ieee.org/starnp/stamp.jsp?tp=&arnurnber=5573965&tag=1 (Year: 2010).*

Korean Office Action for related Korean Application No. 10-2015-0191437; action dated Mar. 28, 2019; (5 pages).

* cited by examiner ly vehicle by considering a braking characteristic, and more particularly, to a system for con-">
SYSTEM FOR CONTROLLING SPEED OF RAILWAY VEHICLES BY CONSIDERING BRAKING CHARACTERISTIC

CROSS REFERENCE TO RELATED APPLICATION

This application claims the benefit of Korean Patent Application No. 10-2015-0191437, filed on Dec. 31, 2015, entitled "SYSTEM FOR CONTROLLING SPEED OF RAILWAY VEHICLES CONSIDERING BRAKE CHARACTERISTICS", which is hereby incorporated by reference in its entirety into this application.

BACKGROUND

1. Technical Field

The present disclosure related to a system for controlling a speed of a railway vehicle by considering a braking characteristic, and more particularly, to a system for controlling a speed of a railway vehicle by considering a braking characteristic, which is capable of calculating a time-to-target-speed-crossing (TTTSC) in real time until when a train speed exceeds a speed of an automatic train operation (ATO) profile through a future speed estimation of the train and controlling the train speed to be interlocked with the calculated TTTSC.

2. Description of the Related Art

In case of a communication-based train control (CBTC) system that is operated by a radio communication, a protection-related control of a train is performed by an automatic train protection (ATP) device. A control related to an automatic operation such as a controlling of a train speed and the like is performed by an automatic train operation (ATO) device.

The ATP device sets an ATP speed profile, an ATP speed limit, or the like in consideration of various factors including a train speed limit at each section, a stop position according to movement authority, a safety braking model, and the like. The speed limit being set as such above is transmitted to the ATO device, and the ATO device generates an ATO speed profile in consideration of various factors such as ride comfort, a pressure-sensitive coefficient, and the like so as to prevent the train, which operates currently, from exceeding the speed limit.

An ATO speed tracking controller compares the ATO speed profile with a current speed of the train and applies a traction instruction to a traction device of the train and a braking instruction to a braking device thereof, thereby controlling the train to track the ATO speed profile.

That is, in the ATO system, in order to enable the train to operate in tracking a target speed that is the ATO speed profile being set at each operation section according to an operation strategy of the train within a range not exceeding the speed limit, the ATO speed tracking controller controls the traction device of the train and the braking device thereof.

In controlling the traction device of the train and the braking device thereof, when a current speed of the train is below a speed of a preset ATO speed profile, the ATO speed tracking controller transmits a traction instruction to the traction device to perform a control of increasing the speed of the train. On the other hand, when the current speed of the train is over a speed of the preset ATO speed profile, the ATO speed tracking controller transmits a braking instruction to the braking device of the train to perform a control of decreasing the speed of the train.

However, when the braking device of the train receives the braking instruction, a braking operation of 100% is not immediately performed due to a characteristic of the braking device and a certain time is required to obtain the braking operation of 100%. The reason for that is that a time is required for a compressed air of the braking device to flow and a mechanical gap basically exists in the braking device.

A distance in which the trains runs from receiving the braking instruction to performing the braking operation is referred to as a "free running distance,' a running time of the train is referred to as a 'free running time,' and these meanings will be described in detail below.

Such a free running time is varied according to a characteristic of a braking device, the number of cars of a train, and the like. Generally, a variable voltage variable frequency (VVVF) electric rail car has a free running time of about 1.2 seconds, and a train for passengers has a free running time in the range of 5 to 9 seconds.

Typically, a braking distance of a train is a sum of an effective braking distance and a free running distance, and the free running distance refers to a distance in which a train moves for a free running time. That is, a distance, in which a train moves until an predicted braking force reaches up to 75% after a braking instruction is input to a braking device, is a free running distance, and a time required for running the free running distance is a free running time.

The effective braking distance is defined as a distance in which the train brakes and moves in a state in which a braking force is sufficiently increased over 75% of the predicted braking force.

Also, the free running distance is defined as a sum of a distance in which the train moves from a time when the braking instruction is input to the braking device to a time when no braking operates and a distance in which the train moves from a time when braking operates to a time when the braking force reaches up to 75% of the predicted braking force.

In other words, the train coasts for a certain time without an effective braking force after the braking instruction is input to the braking device of the train, and the braking force gradually increases at one point. At this point, a distance, in which the train moves until the time when the braking force being increasing reaches up to 75% of the predicted braking force, is the free running distance, and a time from when the braking instruction is input to when the braking force reaches up to 75% of the predicted braking force is the free running time.

In controlling a speed of a train, a speed control of the train is necessary in consideration of a free running time that is a characteristic of such a braking device. That is, in the ATO system, the train operates in a state in which a braking force is not substantially generated in the train even though a braking instruction is input to a braking device at a time when a current speed of the train exceeds a speed of an ATO speed profile. As a result, the train may operate in a state in which a speed of the train considerably exceeds a target speed, and, in some cases, the speed of the train may exceed an ATP speed limit to cause emergency braking.

Therefore, the present disclosure proposes a new method capable of more effectively enabling a train operation by controlling a speed of a train in consideration of a braking characteristic of the train, such as a free running time and the like in an automatic operation system of the train.

SUMMARY

To address the above described problem, an abject of the present disclosure is to provide a speed control system of a railway vehicle in consideration of a braking characteristic, which is capable of calculating in real time a time-to-target-speed-crossing (TTTSC) that is a time required for a speed of a train to exceed a speed of an automatic train operation (ATO) speed profile through a future speed estimation of the train, and controlling the speed of the train to be interlocked with the calculated TTTSC.

The objects of the present disclosure are not limited to the above described object, and other objects and advantages not mentioned above will be understood in the art from the following description and also will be apparently understood by an embodiment of the present disclosure. Also, it will be easily understood that the object and advantages of the present disclosure described herein may be implemented by means and a combination thereof defined by the appended claims.

To attain the above described object, a speed control system of a railway vehicle according to the present disclosure is configured to include a speed control unit, and a braking control unit, wherein the braking control unit includes a future speed estimation unit configured to estimate a future speed of a train using track data and train data, a TTTSC calculation unit configured to calculate a TTTSC using the future speed of the train, which is estimated from the future speed estimation unit, and a brake output determination unit configured to determine a brake output through a comparison between the TTTSC and a braking characteristic value of the train and transmit the brake output determination signal to the speed control unit, and wherein the TTTSC is a remaining time until when a current speed of the train is the same as that of an ATO speed profile.

Here, the speed control unit may preferably include an ATO speed profile generation unit configured to generate an ATO speed profile using an automatic train protection (ATP) speed limit, a comparator configured to generate an error signal by comparing the ATO speed profile generated from the ATO speed profile generation unit with the current speed of the train, and a speed controller configured to generate a speed control signal by receiving the error signal generated through the comparator and the brake output determination signal.

At this point, the future speed estimation unit may be configured to estimate the future speed of the train using train information including a dynamic model of the train, traction force information, and braking force information, and track information track information including track slope information and curvature information.

Further, the brake output determination unit may be configured to output an activated brake signal when the TTTSC value calculated through the TTTSC calculation unit is equal to or less than the braking characteristic value of the train, and outputs an inactivated brake signal when the TTTSC exceeds the braking characteristic value of the train.

As described above, in accordance with the present disclosure, a TTTSC, which is a time for a speed of a train to exceed a speed of an ATO speed profile, is calculated in real time through a future speed estimation of the train and a braking instruction is output on the basis of the calculated TTTSC so that effects such as an increase of operation efficiency of the train and the like may be provided through a determining of an appropriate speed reduction time in consideration of a braking characteristic such as a free running time.

Consequently, a train operation exceeding an ATP speed limit may be prevented so that an additional effect such as an increase of a number of times that the train operates may be provided through a minimizing of generation of emergency braking of the train and an operation delay of the train.

DETAILED DESCRIPTION

Figure 1:
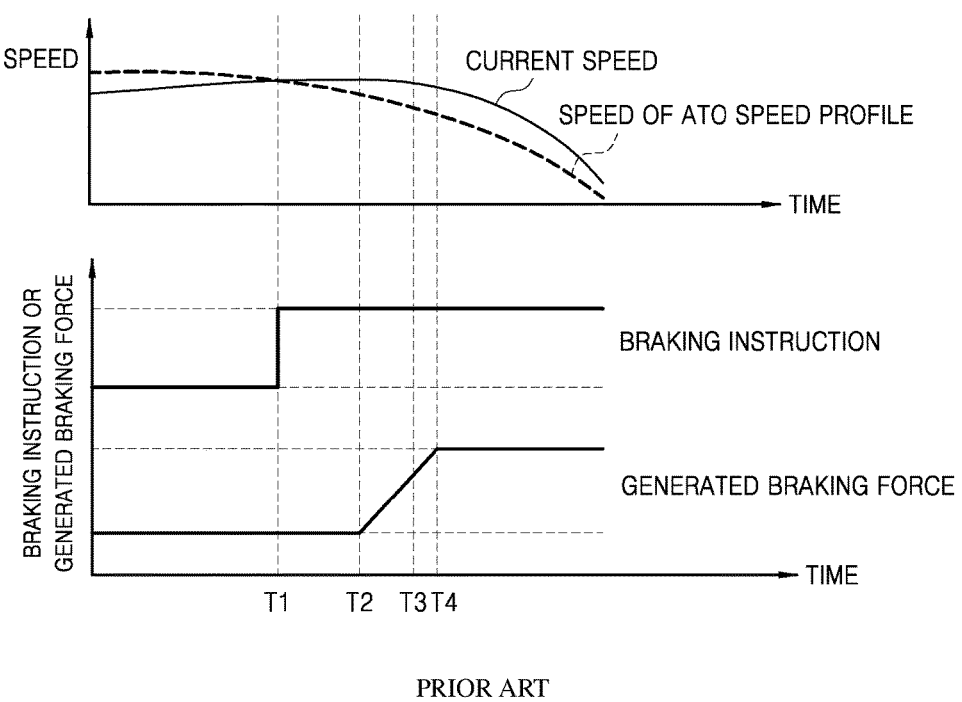
FIG. 1 is a graph for describing a speed control method of a train according to the related art.

The above and other objects, features and advantages of the present disclosure will be described later in detail with reference to the accompanying drawings, and thus the technical spirit of the present disclosure can be easily implemented by those skilled in the art. In the following description of the present disclosure, if a detailed description of known configurations and functions is determined to obscure the interpretation of embodiments of the present disclosure, the detailed description thereof will be omitted.

Hereinafter, preferred embodiments according to the present disclosure will be described in detail with reference to the accompanying drawings. In the drawings, the same reference numerals refer to the same or similar elements throughout.

FIG. 1 is a graph for describing a speed control method of a train according to the related art.

In a speed control method of a train according to the related art, although braking of a train is performed by a train driver or braking by an automatic train operation (ATO) is performed so as to reduce a speed of the train, the train moves for a certain time in a state in which a braking force is not generated. That is, even when a braking instruction is applied to a braking device of the train, there exists a time for which the train coasts for a certain time.

Such a phenomenon generates due to a flow of a compressed air or a mechanical gap inside the braking device, and it occurs during a time between T2 and T1 shown in FIG. 1.

In other words, referring to FIG. 1, when a braking operation occurs at T1, a braking force is not generated until T2. Thereafter, the braking force is gradually generated to reach up to 75% of a predicted braking force at T3 and it reaches up to 100% of the predicted braking force at T4.

At this point, a time (T3−T1) is defined as a free running time, and a distance in which the train moves for a time from T1 to T3 is defined as a free running distance.

A conventional automatic operation apparatus of a train controls a traction device and a braking device thereof to control a speed of the train. More particularly, through a comparison between a current speed of the train and a speed of a preset ATO speed profile, when the current speed is below the speed of the preset ATO speed profile, a controlling of increasing the speed of the train is performed by transmitting a traction instruction to the traction device. On the other hand, when the current speed is over the speed of the preset ATO speed profile, a controlling of decreasing the speed of the train is performed by transmitting a braking instruction to the braking device.

However, such a related art does not consider a braking characteristic such as a free running time and the like in controlling of the braking device of the train. Consequently, when the current speed of the train is over the speed of the preset ATO speed profile, the train coasts without a braking force for a time (T2–T1). As a result, there is a problem in that the speed of the train considerably exceeds the speed defined at the ATO speed profile.

Also, in controlling of a speed of a train, a conventional ATO applies a braking instruction to a braking device when a current speed of the train is over the speed of the preset ATO speed profile. Such a control is performed without considering a braking characteristic of the braking device. Therefore, the train coasts for a certain time without generation of a braking force after the braking instruction is applied. In this case, as described above, the braking force is not sufficiently generated for the free running time so that the speed of the train is not decreased as intended.

That is, even when the braking instruction is applied, the train moves for a certain time without generation of a braking force. As a result, the train moves to exceed the speed of the ATO speed profile, and, in some cases, it exceeds an automatic train protection (ATP) speed limit to cause a problem in that emergency braking is required.

However, in such a conventional related art, it is difficult to predict that the current speed of the train will exceed the speed of the ATO speed profile after a few seconds so that there is no method for determining when the braking instruction should be applied in advance.

In summary, the speed control method of a train according to the related art as described above could not immediately provide a sufficient braking when braking is required so that the train may frequently operates exceeding a target speed. Also, in accordance with the speed control method of a train according to the related art, the train operates exceeding a speed limit although the braking instruction is applied so that there is a problem in that emergency braking and the like are caused to degrade efficiency of a train operation.

Figure 2:
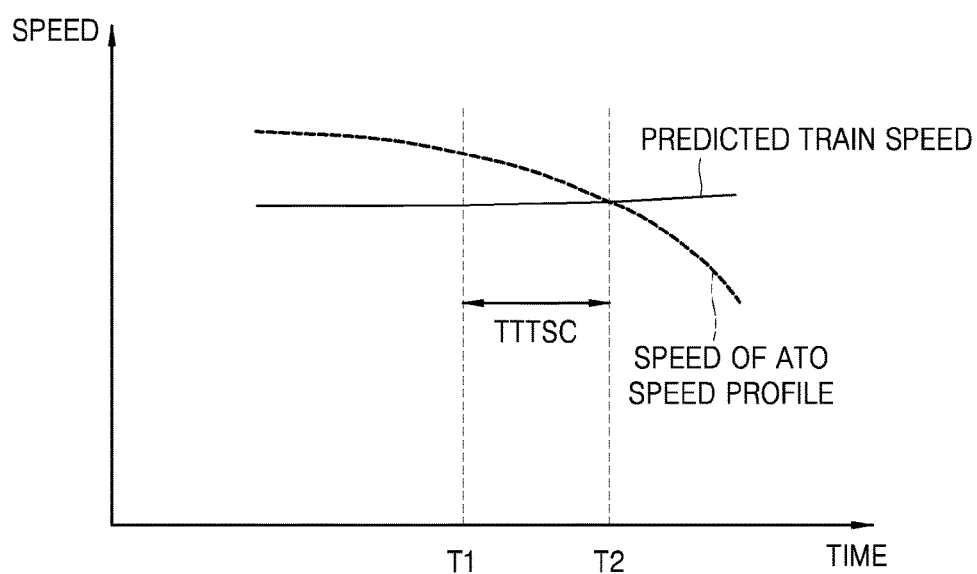
FIG. 2 is a graph for describing a time-to-target-speed-crossing (TTTSC) applied to a speed control system of a railway vehicle according to an embodiment of the present disclosure.

FIG. 2 is a graph for describing a time-to-target-speed-crossing (TTTSC) applied to a speed control system of a railway vehicle according to an embodiment of the present disclosure.

In the present disclosure, a TTTSC value is defined as a remaining time until a current speed of a train exceeds a speed proposed from an ATO speed profile that is an operation target speed profile. The present disclosure provides a configuration in which the TTTSC value may be calculated in real time and a braking instruction may be applied to a braking device of a train when the TTTSC value is equal to or less than a free running time or a set value.

That is, as shown in FIG. 2, the present disclosure designates a TTTSC as a remaining time from a current time T1 to a time T2 when a speed of a train is the same as that of an ATO speed profile. The present disclosure may propose the speed control system of a railway vehicle, which has a configuration for implementing such an operation in real time, and may effectively decrease a speed of a train to serve to enable the train to operate in a state in which the train does not exceed a target speed.

Consequently, the train is able not to exceed a speed limit by an ATP to increase operation efficiency of the train so that there is provided an economical and efficient train operation system through an increase of the number of times that the train operates and the like.

Figure 3:
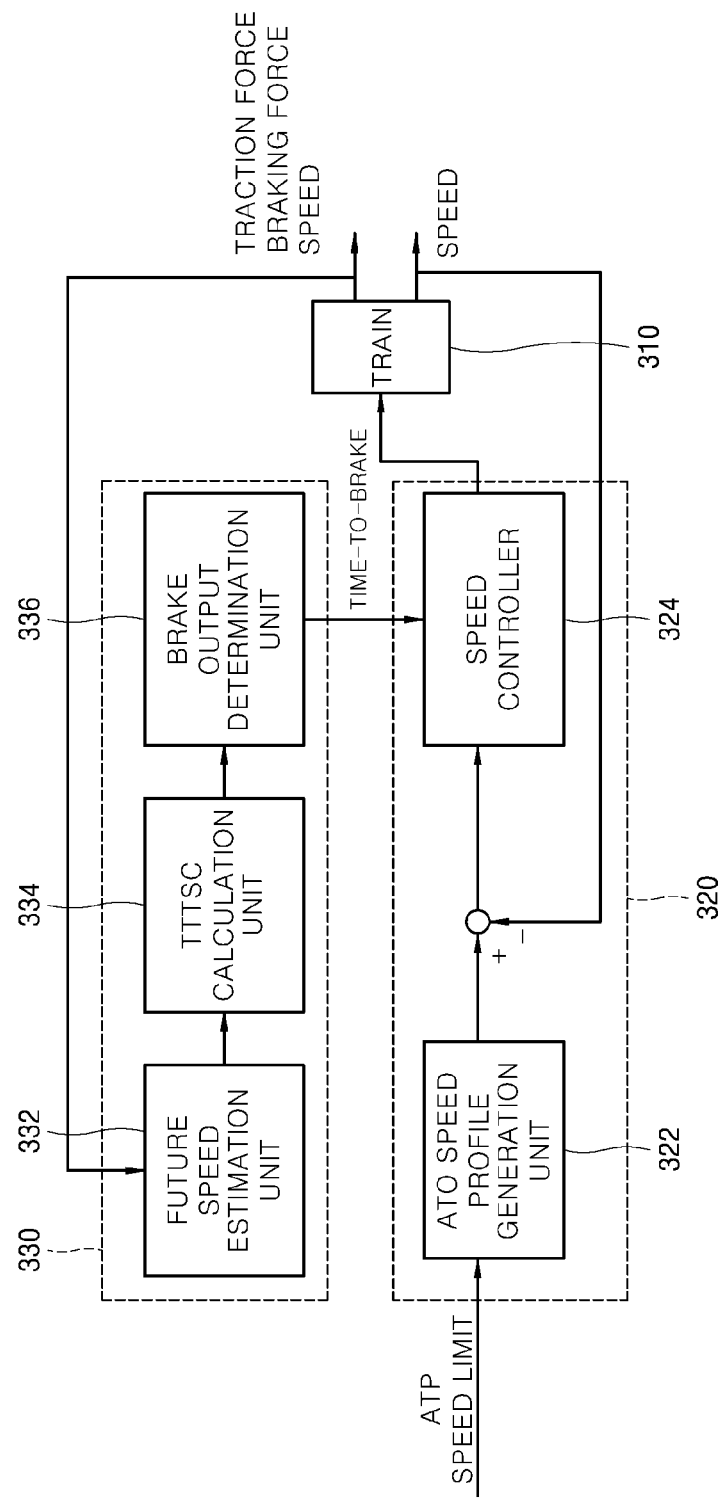
FIG. 3 is a diagram illustrating a configuration of a speed control system of a railway vehicle according to one embodiment of the present disclosure.

FIG. 3 is a diagram illustrating a configuration of a speed control system of a railway vehicle according to one embodiment of the present disclosure.

Referring to FIG. 3, a speed control system of a railway vehicle according to one embodiment of the present disclosure may be configured to include a speed control unit 320, a braking control unit 330, and the like. The speed control unit 320 includes an ATO speed profile generation unit 322 and a speed controller 324, and the braking control unit 330 includes a future speed estimation unit 332, a TTTSC calculation unit 334, and a brake output determination unit 336.

Similar to a conventional ATO speed profile generation unit, the ATO speed profile generation unit 322 provided in the speed control unit 320 serves to generate an ATO speed profile using an ATP speed limit.

A comparator generates an error signal using the ATO speed profile generated through the ATO speed profile generation unit 322 and a current speed of a train and transmits the error signal to the speed controller 324.

The speed controller 324 generates a speed control signal by receiving the error signal generated through the comparator and a brake output determination signal transmitted from the braking control unit 330. With such a speed control signal, a controlling of traction or braking of a train 310 is accomplished.

That is, when the error signal transmitted through the comparator is a positive (+) value exceeding a prescribed rage, and, in other words, when the current speed of the train is less than a predetermined level compared to the ATO speed profile, an ATO apparatus according to the related art determines traction of the train. On the other hand, when the current speed of the train is greater than the predetermined level compared to the ATO speed profile, a train operation was controlled in a manner in which braking of the train is determined. However, the speed control system of a railway vehicle according to the embodiment of the present disclosure, as shown in FIG. 3, estimates a future speed in consideration of a braking characteristic and the like of the train and calculates a TTTSC value to interlock with the predicted future speed. Further, the speed control system is configured such that the speed control unit 320 utilizes the brake output determination signal calculated based on the TTTSC value after the TTTSC value is calculated. Therefore, the present disclosure may provide an advantage in which a braking characteristic and the like are reflected to enable an actual and efficient speed control.

Hereinafter, a process of generating the brake output determination signal by the braking control unit 330 will be described in detail.

The future speed estimation unit 332 provided in the braking control unit 330 serves to estimate a future speed of a train using track data including a dynamic model of a train, slope (grade) information of a track, curvature information, and the like, and train data including traction information, braking information, and the like.

Further, the TTTSC calculation unit 334 calculates a TTTSC value in real time using the future speed of the train, which is estimated through the future speed estimation unit 332.

Using such a TTTSC value and a braking characteristic value of a train, the brake output determination unit 336 outputs an activated or inactivated brake output signal. In other words, the brake output determination unit 336 outputs an activated brake signal when the TTTSC value calculated through the TTTSC calculation unit 334 is equal to or greater than the braking characteristic value of the train. On the other hand, when the TTTSC value is less than the braking characteristic value of the train, the brake output determination unit 336 is configured to output an inactivated brake signal.

Here, the braking characteristic value refers to an experimental value or a calculated value that is set to correspond to a free running time of each train so as to minimize a response delay generated due to a free running time that is a braking characteristic of a train. The braking characteristic value may be configured to be stored and managed through the braking control unit 330, or to be received in real time from an external database device and the like.

A function and an operation of each component provided in the braking control unit 330 will be described in more detail below.

First, a future speed estimation of a train through the future speed estimation unit 332 may be implemented through an N-step ahead future speed estimator and its algorithm which estimate a speed of a train after a certain time on the basis of a current speed of the train and a dynamic model thereof.

That is, the future speed estimation unit 332 obtains traction information from the traction device of the train and braking information from the braking device thereof and receives track information including a slope (grade) information and curvature information using various sensors. Also, a dynamic model is produced on the basis of a longitudinal model of a railway vehicle, and a future speed of the train is predicted on the basis of such a dynamic model of a railway vehicle and data measured from the sensors.

The longitudinal dynamic model of the train may be obtained as Equation 1 from Newton's second law.

$$m\frac{dv}{dt} = T_e - T_b - R_r - R_g - R_c \quad \text{[Equation 1]}$$

Here, m is a train equivalent mass, v is a train longitudinal speed, $T_e$ is a traction force, and $T_b$ is a braking force. Also, $R_r$ is a running resistance and it is a sum of rolling resistance and aerodynamic drag. Further, $R_g$ represents grade resistance, and $R_c$ represents curving resistance.

The train equivalent mass m is defined such that a total mass of railway vehicles is defined as an equivalent mass by assuming a number of railway vehicles as one lumped mass although a train is actually configured with the number of railway vehicles connected to each other. The traction force $T_e$ and the braking force $T_b$ are received from the traction device and the braking device, respectively. The running resistance $R_r$ is represented by a sum of the rolling resistance and the aerodynamic drag, and may be modelled as a second order equation with respect to a speed as Equation 2.

$$R_r = c_1 + c_2 v + c_3 v^2 \quad \text{[Equation 2]}$$

Here, $c_1$, $c_2$, and $c_3$ are respectively a constant, a second order term with respect to a speed is an equation with respect to the aerodynamic drag, and a first order with respect to the speed and the constant term represent an equation with respect to the rolling resistance.

The grade resistance is expressed as the train equivalent mass and a relational expression with respect to a degree of grade as the following Equation 3.

$$R_g = mg\theta \quad \text{[Equation 3]}$$

Here, m represents the train equivalent mass, g represents an acceleration of gravity, and θ represents a slope angle (a grade angle). That is, when a slope is very small, the grade resistance may be neglectable.

Also, the curving resistance is a function with respect to a radius of a curve and may be expressed as the following Equation 4.

$$R_c = c_4/r \quad \text{[Equation 4]}$$

Here, $c_4$ is a constant, and r is a curvature radius.

When Equations 2 to 4 are substituted in Equation 1, it may be formulated into the following Equation 5.

$$m\frac{dv}{dt} = T_e - T_b - c_1 - c_2 v - c_3 v^2 - mg\theta - c_4/r \quad \text{[Equation 5]}$$

Further, when the train longitudinal dynamic model is discrete, it may be expressed as the following Equation 6.

$$v(k) = \\ v(k-1) + \frac{\Delta T}{m}[T_e(k-1) - T_b(k-1) - c_1 - c_2 v(k-1) - \\ c_3 v(k-1)^2 - mg\theta(k-1) - c_4/r(k-1)] \quad \text{[Equation 6]}$$

Here, $\Delta T$ is a sampling period.

Using Equation 6, an N-step ahead future speed estimator predicting a future speed of a train after an N-step will be designed.

For this purpose, it is assumed that the traction force and the braking force which are currently applied to a railway vehicle are not varied and constant. When a speed of the train is estimated after a first-step to a third-step using the dynamic model so as to estimate a future speed of the train, it may be obtained as the following Equations 7 to 9.

$$v(k+1) = v(k) + \frac{\Delta T}{m}[c_2 v(k) - c_3 v(k)^2] + \\ \frac{\Delta T}{m}[T_e(k) - T_b(k) - mg\theta(k) - c_4/r(k)] \quad \text{[Equation 7]}$$

$$v(k+2) = v(k+1) + \frac{\Delta T}{m}[c_2 v(k+1) - c_3 v(k+1)^2] + \\ \frac{\Delta T}{m}[T_e(k) - T_b(k) - mg\theta(k) - c_4/r(k)] \quad \text{[Equation 8]}$$

$$v(k+3) = v(k+2) + \frac{\Delta T}{m}[c_2 v(k+2) - c_3 v(k+2)^2] + \\ \frac{\Delta T}{m}[T_e(k) - T_b(k) - mg\theta(k) - c_4/r(k)] \quad \text{[Equation 9]}$$

Further, with such a similar method, when a speed of the train is estimated after a $(n-1)^{th}$ step and an $n^{th}$ step, it may be obtained as the following Equations 10 and 11, respectively.

$$v(k+n-1) = \\ v(k+n-2) + \frac{\Delta T}{m}[c_2 v(k+n-2) - c_3 v(k+n-2)^2] + \\ \frac{\Delta T}{m}[T_e(k) - T_b(k) - mg\theta(k) - c_4/r(k)] \quad \text{[Equation 10]}$$

$$v(k+n) = \\ v(k+n-1) + \frac{\Delta T}{m}[c_2 v(k+n-1) - c_3 v(k+n-1)^2] + \\ \frac{\Delta T}{m}[T_e(k) - T_b(k) - mg\theta(k) - c_4/r(k)] \quad \text{[Equation 11]}$$

Using Equations 7 to 11 sequentially, a speed of the train at a $(k+n)^{th}$ step may be estimated using railway vehicle data at a $k^{th}$ step.

In other words, using the speed of the train and the train dynamic model at the $k^{th}$ step, a future speed of the train at the $(k+n)^{th}$ step may be estimated.

Further, as described above, using the future speed of the train, which is estimated through the future speed estimation unit 332, the TTTSC calculation unit 334 may calculate a TTTSC in real time.

That is, using the estimated speed of the train as described above, the TTTSC calculation unit 334 serves to calculate a time at which the train may reach an operation target speed that is determined at an ATO speed profile.

It is assumed that a speed of the train exceeds a target speed at the $n^{th}$ step. This is expressed as follows.

$$v(k+n) \geq v_{target} \quad \text{[Equation 12]}$$

Here, $v_{target}$ is an ATO target speed. If k is a current time, this refers that a speed of the train after the $n^{th}$ step is equal to or greater than a target speed. Then, a TTTSC may be calculated as the following Equation 13.

$$TTTSC = n \times \Delta T \quad \text{[Equation 13]}$$

Here, a unit of the TTTSC is a second, and ΔT is the sampling period.

The brake output determination unit 336 outputs an activated or inactivated brake output signal using the TTTSC obtained as described above, and such a process is expressed as the following Equation 14.

if $TTTSC \leq T_{threshold}$

Activate Time-To-Brake command else

Deactivate Time-To-Brake command  [Equation 14]

Here, $T_{threshold}$ is a braking characteristic value that is set so as to minimize a response delay according to a free running time due to a braking characteristic. When the TTTSC value being calculated is equal to or less than the braking characteristic value, the brake output determination unit 336 transmits a time-to-brake instruction to the speed control unit 320 so as to apply a braking output. On the other hand, when the TTTSC value exceeds the braking characteristic value, the brake output determination unit 336 inactivates the time-to-brake instruction.

In other words, when the TTTSC value calculated through the TTTSC calculation unit 334 is equal to or less than the braking characteristic value of the train, the brake output determination unit 336 outputs an activated brake signal. On the other hand, when the TTTSC value exceeds the braking characteristic value of the train, the brake output determination unit 336 is configured to output an inactivated brake signal.

For example, when $T_{threshold}$ is 5 seconds and a TTTSC is less than 5 seconds, a speed of the train exceeds a speed of the ATO speed profile within 5 seconds. To prevent the speed of the train from exceeding the speed of the ATO speed profile, the brake output determination unit 336 may activates the time-to-brake instruction. On the other hand, when $T_{threshold}$ is 5 seconds and a TTTSC is greater than 5 seconds, a speed of the train does not exceed the speed of the ATO speed profile so that the brake output determination unit 336 may inactivate the time-to-brake instruction.

Further, the speed controller 324 receives an error speed and a brake output determination signal based on the TTTSC as inputs, determines a traction instruction or a braking instruction with respect to the train, and transmits a control signal according to the determination result to a traction device or a braking device of the train.

That is, when the time-to-brake instruction is received from the braking control unit 330 while the traction instruction is output by means of the error speed, a traction output is blocked and a braking instruction is applied to the braking device. With such a manner, a speed control of the train is performed to direct the speed of the train to track the speed of the ATO speed profile.

Through a next drawing, an operation process, which has been described above, of the speed control system of a railway vehicle according to an embodiment of the present disclosure will be described again.

Figure 4:
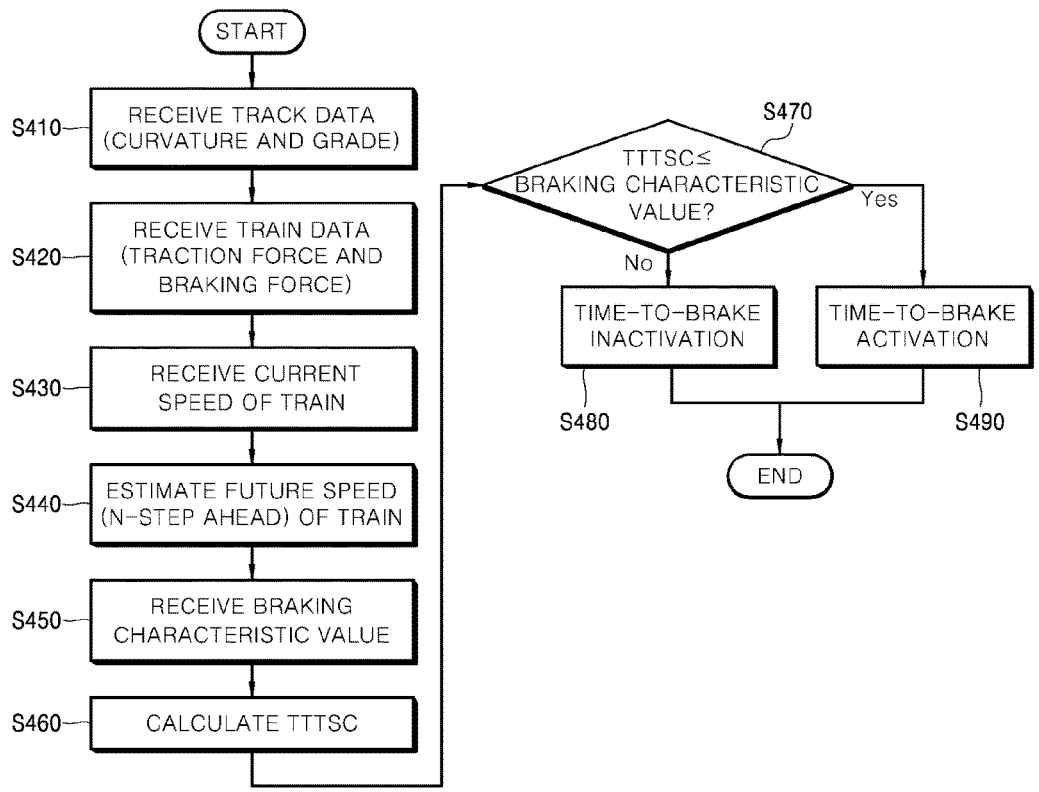
FIG. 4 is a flow chart for describing a speed control method of the railway vehicle, which is applied to FIG. 3.

FIG. 4 is a flow chart for describing the speed control method of the railway vehicle, which is applied to FIG. 3.

Referring to FIG. 4, the speed control method of a railway vehicle according to the embodiment of the present disclosure is configured with receiving track data in Operation S410, receiving train data in Operation S420, receiving a current speed of a train in Operation S430, estimating a future speed of the train in Operation S440, receiving a braking characteristic value in Operation S450, calculating a TTTSC in Operation S460, and generating an activated or inactivated brake output signal through a comparison between the TTTSC and the braking characteristic value in Operations S470 to S490.

That is, in the present disclosure, the future speed estimation unit 332 estimates the future speed of the train using track data including curvature information and slope information of a track, train data including traction force information and braking force information of the train, a dynamic model of the train, current speed information thereof, and the like in Operation S440. Further, the TTTSC calculation unit 334 calculates the TTTSC using the estimated future speed information of the train in Operation S460, and then generates and transmits a brake output signal through the braking characteristic value of the train received in Operation S450 and the TTTSC. Furthermore, the speed control unit 320, which received the brake output signal, is configured to serve to control traction or braking of the train in response to the brake output signal.

At this point, various calculation processes for implementing each of functions have been described with reference to the separate drawings.

Further, in accordance with the present disclosure as described above, the automatic operation system of a train may control a speed of a train in consideration of a braking characteristic of a train, such as a free running time and the like. Consequently, the braking instruction is input to the braking device of the train at a more appropriate time to enable a more efficient train operation, and thus an emergency braking situation and the like of the train may be minimized. As described above, various effects such as an increase of a number of times that the train operates and the like may be provided.

Although the present disclosure has been described with reference to the embodiments, it should be understood that numerous other substitutions, modifications and alterations can be devised by those skilled in the art without departing the technical spirit of this disclosure, and thus it should be construed that the present disclosure is not limited by the embodiments described above and the accompanying drawings.

What is claimed is:

1. A speed control system of a train, comprising:
a speed control unit; and
a braking control unit,
wherein the braking control unit includes:
   a future speed estimation unit configured to estimate a future speed of the train using track data and train data;
   a time-to-target-speed-crossing (TTTSC) calculation unit configured to calculate a TTTSC using the future speed of the train, which is estimated from the future speed; and
   a brake output determination unit configured to determine a brake output determination signal through a comparison between the TTTSC and a braking characteristic value of the train and transmit the brake output determination signal to the speed control unit to apply a braking output to the train,
wherein the TTTSC is a remaining time until when a speed of the train is the same as that of an automatic train operation (ATO) profile, and
wherein the braking characteristic value is set to minimize a response delay according to a free running time due to a braking characteristic.

2. The speed control system of claim 1, wherein the speed control unit includes:
   an ATO speed profile generation unit configured to generate an ATO speed profile using an automatic train protection (ATP) speed limit;
   a comparator configured to generate an error signal by comparing the ATO speed profile generated from the ATO speed profile generation unit with the current speed of the train; and
   a speed controller configured to generate a speed control signal by receiving the error signal generated through the comparator and the brake output determination signal.

3. The speed control system of claim 1, wherein the future speed estimation unit estimates the future speed of the train using train information including a dynamic model of the train, traction force information, and braking force information, and track information including track slope information and curvature information.

4. The speed control system of claim 1, wherein the brake output determination unit outputs an activated brake signal when the TTTSC calculated through the TTTSC calculation unit is equal to or less than the braking characteristic value of the train, and outputs an inactivated brake signal when the TTTSC exceeds the braking characteristic value of the train.

5. The speed control system of claim 1, wherein the free running time is a time in which the train runs from a time when the braking instruction is input to a time when braking is operated.

* * * * *